(12) United States Patent
Liu et al.

(10) Patent No.: US 9,282,031 B2
(45) Date of Patent: Mar. 8, 2016

(54) NETWORK SYSTEM AND ROUTING METHOD

(71) Applicants: Inventec (Pudong) Technology Corporation, Shanghai (CN); INVENTEC CORPORATION, Taipei (TW)

(72) Inventors: Te-Yen Liu, Taipei (TW); Chien-Chih Lin, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 77 days.

(21) Appl. No.: 14/228,263

(22) Filed: Mar. 28, 2014

(65) Prior Publication Data

US 2014/0355612 A1  Dec. 4, 2014

(30) Foreign Application Priority Data

May 31, 2013  (CN) .......................... 2013 1 0211949

(51) Int. Cl.
*H04L 12/721* (2013.01)
*H04L 12/751* (2013.01)
*H04L 12/24* (2006.01)
*H04L 12/707* (2013.01)
*H04L 12/717* (2013.01)
*H04L 12/735* (2013.01)

(52) U.S. Cl.
CPC ................ *H04L 45/38* (2013.01); *H04L 41/12* (2013.01); *H04L 45/02* (2013.01); *H04L 45/12* (2013.01); *H04L 45/22* (2013.01); *H04L 45/42* (2013.01); *H04L 45/128* (2013.01)

(58) Field of Classification Search
None
See application file for complete search history.

(56) References Cited

U.S. PATENT DOCUMENTS

| | | | |
|---|---|---|---|
| 2003/0028670 A1* | 2/2003 | Lee et al. | 709/241 |
| 2009/0285208 A1 | 11/2009 | Lu | |
| 2010/0077103 A1* | 3/2010 | Matsumoto | 709/241 |
| 2012/0213063 A1 | 8/2012 | Lu et al. | |
| 2012/0257626 A1* | 10/2012 | McGhee et al. | 370/392 |
| 2013/0279323 A1* | 10/2013 | Allan | 370/225 |

* cited by examiner

*Primary Examiner* — Thai Nguyen
(74) *Attorney, Agent, or Firm* — CKC & Partners Co., Ltd.

(57) ABSTRACT

A network system and a routing method are disclosed herein. The routing method includes receiving a route planning request corresponding to a packet flow; calculating a corresponding value according to the route planning request; comparing the corresponding value with a plurality of matching values stored in a storage space; and under a condition that the corresponding value matches a corresponding one of the matching values, acquiring an assigning path stored in the storage and routing the packet flow along the assigning path.

6 Claims, 2 Drawing Sheets

NETWORK SYSTEM AND ROUTING METHOD

RELATED APPLICATIONS

This application claims priority to Chinese Application Serial Number 201310211949.1, filed May 31, 2013, which is herein incorporated by reference.

BACKGROUND

1. Field of Invention

The present disclosure relates to an electronic system and a routing method. More particularly, the present disclosure relates to a network system and a routing method.

2. Description of Related Art

With advances in information technology, various kinds of network systems are widely used in our daily lives. Examples of such network systems include local area network systems, internet network systems, and data center network systems.

Typically, a network system includes a plurality of nodes (e.g., switches). Upon reception of a packet, a node determines whether a characteristic of the received packet matches requirements of packet forwarding rules in the node itself, and forwards the received packet according to the packet forwarding rules. However, the packet forwarding rules may become invalid due to errors or due to having surpassed their effective dates. Therefore, when a node receives a packet, even if the characteristics of the packet are identical to a packet the node forwarded before, the node still has to plan a transmission path again to forward the received packet. As a result, the efficiency of the network system is decreased.

Thus, there is a need to redesign network systems to avoid unnecessary planning of transmission paths that would lead to decreasing the efficiency of the network systems.

SUMMARY

One aspect of the present disclosure is related to a routing method. In accordance with one embodiment of the present disclosure, the routing method is applied to a network system. The network system includes a plurality of nodes and a controller, and the controller includes a storage space. The routing method includes transmitting identification information of the plurality of nodes to the controller through the plurality of nodes, respectively; receiving the identification information to construct a network topology diagram through the controller; transmitting a route planning request corresponding to a packet flow to the controller through one of the plurality of nodes; receiving the route planning request and calculating a corresponding value according to the route planning request through the controller; comparing the corresponding value with a plurality of matching values stored in the storage space through the controller, so as to determine whether the corresponding value matches one of the plurality of matching values; and under a condition that the corresponding value matches a corresponding one of the plurality of matching values, acquiring an assigning path of the packet flow stored in the storage space according to the corresponding one of the plurality of matching values, and routing the packet flow along the assigning path through the controller.

Another aspect of the present disclosure is related to a network system. In accordance with one embodiment of the present disclosure, the network system includes a plurality of nodes and a controller. The plurality of nodes are configured to output identification information. One of the plurality of nodes is configured to output a route planning request corresponding to a packet flow. The controller includes a storage space. The controller is configured for receiving the identification information to construct a network topology diagram; receiving the route planning request and calculating a corresponding value according to the route planning request; comparing the corresponding value with a plurality of matching values stored in the storage space, so as to determine whether the corresponding value matches one of the plurality of matching values; and under a condition that the corresponding value matches a corresponding one of the plurality of matching values, acquiring an assigning path of the packet flow stored in the storage space according to the corresponding one of the plurality of matching values, and routing the packet flow along the assigning path.

Through an application of one embodiment of the present disclosure, a routing method can be realized. In the routing method, the paths of the packet flow can be planned and stored by utilizing the controller, so that after packet forwarding rules of the nodes in the network become invalid, new packet forwarding rules can be provided to the nodes instantly.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
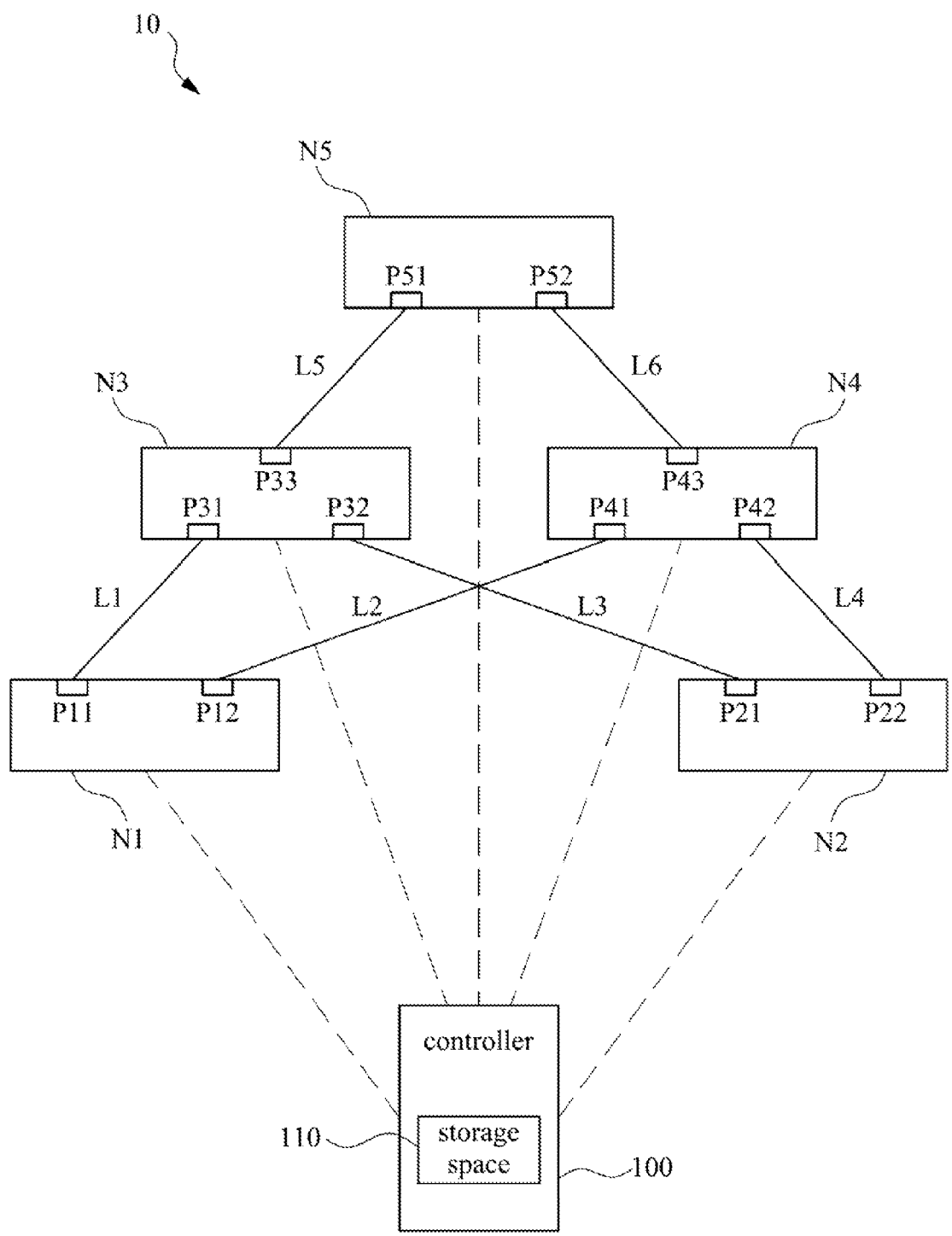
FIG. 1 is a schematic diagram of a network system in accordance with one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

It will be understood that, in the description herein and throughout the claims that follow, although the terms first, second, etc. may be used to describe various elements, these elements should not be limited by these terms. These terms are only used to distinguish one element from another. For example, a first element could be termed a second element, and, similarly, a second element could be termed a first element, without departing from the scope of the embodiments.

Any element in a claim that does not explicitly state "means for" performing a specified function, or "step for" performing a specific function, is not to be interpreted as a "means" or "step" clause as specified in 35 U.S.C. §112(f). In particular, the use of "step of" in the claims herein is not intended to invoke the provisions of 35 U.S.C. §112(f).

One aspect of the present disclosure is related to a network system. The network system can use a controller to plan and store paths of a packet flow, so that after packet forwarding rules of nodes in the network become invalid, new packet forwarding rules can be provided to the nodes instantly.

The phrase "packet flow" used herein and throughout the claims that follow indicates a plurality of continuous/discontinuous packets in the network system with identical characteristics, such as source addresses, destination addresses, source port numbers in the transport layer and/or destination port numbers in the transport layer. The source/destination addresses are, for example, source/destination internet protocol addresses (source/destination IP addresses) and/or source/destination media access control addresses (source/destination MAC addresses).

In addition, the phrase "packet forwarding rule" used herein, for example, indicates an entry (e.g., OpenFlow flow entry) stored in a forwarding table (e.g., OpenFlow flow table).

FIG. 1 is a schematic diagram of a network system 10 in accordance with one embodiment of the present disclosure. The network system 10 includes a controller 100 and a plurality of nodes, for example N1-N5. Each of the nodes N1-N5 includes at least one connection port. For example, the node N1 includes the connection ports P11 and P12, and the node N2 includes the connection ports P21 and P22. The controller 100 is connected to each of the nodes N1-N5. Every two adjacent ones of the nodes N1-N5 are connected through the corresponding connection ports to form links. For example, the node N1 and the node N3 are connected through the connection ports P11 and P31 to form the link L1. The node N1 and the node N4 are connected through the connection ports P12 and P41 to form the link L2. "Adjacent nodes" herein refer to two nodes which can be connected with each other through a single link. Additionally, the nodes N1-N5 mentioned above may be compatible with the OpenFlow layer 2 communications protocol, such as OpenFlow switches or routers, and the controller mentioned above may be an OpenFlow controller.

In this embodiment, the controller 100 can include a storage space 110. The storage space 110 can be realized by using, for example, a memory, a hard disk, registers, or other suitable storage media. The storage space 110 can be configured to store one or more matching value(s) corresponding to different packet flows, spare paths corresponding to the packet flows, and assigning paths corresponding to the packet flows.

In this embodiment, the controller 100 can send an instruction to the nodes N1-N5 to instruct the nodes N1-N5 to respectively output to the controller 100 identification information of the nodes N1-N5. Next, the controller 100 can receive the identification information of the nodes N1-N5 to construct a network topology diagram corresponding to the network system 10. The network topology diagram may reflect the connection relation among the nodes N1-N5. In practice, the controller 100 can instruct the nodes N1-N5 to broadcast a link layer discovery protocol (LLDP) packet to the adjacent nodes N1-N5 to make the adjacent nodes N1-N5 exchange the identification information of themselves with each other. Subsequently, the controller 100 can send another instruction to the nodes N1-N5 to cause the nodes N1-N5 to pass the identification information of the adjacent nodes N1-N5 back to the controller 100. Through such operation, the controller 100 can determine the network topology diagram corresponding to the network system 10 via the identification information of the nodes N1-N5.

Under a condition that one of the nodes N1-N5 outputs to the controller 100 a route planning request (e.g., an OpenFlow packet-in message) corresponding to a packet flow, the controller 100 can receive this route planning request and calculate a corresponding value according to this route planning request. For example, this route planning request may contain a source address and a destination address of the packet flow, and the corresponding value may be calculated according to the source address and the destination address of the packet flow (e.g., through a hash function). In this embodiment, each of the packet flows in the network system 10 corresponds to one unique corresponding value.

After the corresponding value of said packet flow is calculated, the controller 100 can compare this corresponding value with matching values stored in the storage space 110, so as to determine whether this corresponding value matches one of the matching values, and accordingly determine whether the storage space 110 has stored an assigning path and one or more spare path(s) of said packet flow already.

Under a condition that the corresponding value matches one of the matching values, which indicates that the storage space 110 has stored an assigning path and one or more spare path(s) of said packet flow already, the controller 100 can acquire the assigning path of said packet flow according to this matching value. Subsequently, the controller 100 can route said packet flow along the acquired assigning path.

In one embodiment, the controller 100 may write packet forwarding rules corresponding to the acquired assigning path into forwarding tables of the nodes through which this assigning path passes, so as to forward said packet flow along this assigning path.

In addition, under a condition that the corresponding value does not match the matching values, which indicates that the storage space 110 does not store any assigning path or any spare path of said packet flow, the controller 100 can search one or more spare path(s) of said packet flow according to the network topology diagram and the route planning request. When there is more than one searched spare path, these spare paths are different from each other. That is, these spare paths pass through different ones of the nodes N1-N5.

After one or more spare path(s) of said packet flow is/are searched, the controller 100 can select one of the one or more spare path(s) of said packet flow to serve as the assigning path of said packet flow according to the route planning request.

With the operations described above, the controller 100 can route said packet flow along this assigning path.

Moreover, after one of the one or more spare path(s) of said packet flow is selected to serve as the assigning path of said packet flow corresponding to the corresponding value, the controller 100 can store the corresponding value in the storage space 110 to serve as a new matching value. The controller 100 can also store the one or more spare path(s) and the assigning path of said packet flow in the storage space 110 corresponding to the new matching value.

With such operation, after the packet forwarding rules corresponding to this assigning path in (at least a part of) the nodes N1-N5 become invalid, the controller 100 can provide new and identical packet forwarding rules to (the at least a part of) the nodes N1-N5 instantly, so as to route the packet flows with identical characteristics to the same transmission path without unnecessary path planning. Thus, the efficiency of the network system 10 can be improved.

In the following paragraphs, details of calculation of the one or more spare path(s) of said packet flow through the controller 100 are provided. However, the present disclosure is not limited to the embodiments below.

In one embodiment, the controller 100 can acquire spare paths corresponding to said packet flow by repeatedly executing a shortest path algorithm (e.g., Dijkstra algorithm). After executing the shortest path algorithm one time to acquire one of the spare paths, the controller 100 selectively tags at least a part of the nodes N1-N5 through which the acquired spare path passes (e.g., tags the nodes through which the acquired spare path passes except for the source node and destination node of the acquired spare path) by using flags. Subsequently, the controller 100 executes the shortest path algorithm again to acquire another one of the spare paths. During this execution of the shortest path algorithm, the tagged nodes are excluded, such that a different one of the spare paths can be acquired. In such a manner, the spare paths of said packet flow can be acquired by the controller 100.

For example, the controller 110 can execute the shortest path algorithm one time in a first period to acquire one of the spare paths (e.g., path N1→N3→N2) and tag the node through which this acquired spare path passes (e.g., the node N1). Subsequently, the controller 110 can execute the shortest path algorithm again in a second period after the first period, in which the tagged node is excluded during executing the shortest path algorithm in the second period, so as to acquire another one of the spare paths (e.g., the path N1→N4→N2). Similarly, the controller 110 tags the node through which said another spare path passes (e.g., the node N4). At this time, since it is not possible for the controller 100 to search another one of the spare paths which does not pass through the tagged nodes (e.g., the nodes N3, N4), the controller 100 stops executing the shortest path algorithm.

Moreover, in one embodiment, the controller 100 can count the number of times the shortest path algorithm is executed, and stop executing the shortest path algorithm after the number reaches a predetermined threshold (e.g., 3). In such a manner, an unnecessary number of spare paths can be avoided, so as to prevent overly increasing the load of the controller 100.

In the following paragraphs, details of selecting one of the spare paths of said packet flow to serve as the assigning path of said packet flow according to the route planning request is provided. However, the present disclosure is not limited to the embodiment below.

In one embodiment, the route planning request may include a source IP address IP_S, a destination IP address IP_D, a source port number P_S, a destination port number P_D, a protocol type P_TYPE, and so on. The controller 100 can calculate a function value H of a hash function according to the source IP address IP_S, the destination IP address IP_D, the source port number P_S, the destination port number P_D, the protocol type P_TYPE, and a quantity of the one or more spare path(s) of said packet flow (the quantity is referred to as Q). Next, the controller 100 can select one of the spare paths of said packet flow to serve as the assigning path of said packet flow according to the function value H of the hash function.

In one embodiment, the source IP address IP_S, the destination IP address IP_D, the source port number P_S, the destination port number P_D, the protocol type P_TYPE, and the quantity Q satisfy the following equation:

$$H=(IP\_S+IP\_D+P\_S+P\_D+P\_TYPE)\%Q.$$

Another aspect of the present disclosure relates to a routing method. The routing method can be applied to a network system having a structure that is the same as or similar to the structure shown in FIG. 1. To simplify the description below, in the following paragraphs, the embodiment shown in FIG. 1 will be used as an example to describe the routing method according to an embodiment of the present disclosure. However, the disclosure is not limited to application to the embodiment shown in FIG. 1.

In addition, it should be noted that, in the steps of the following routing method, no particular sequence is required unless otherwise specified. Moreover, the following steps also may be performed simultaneously or the execution times thereof may at least partially overlap.

Figure 2:
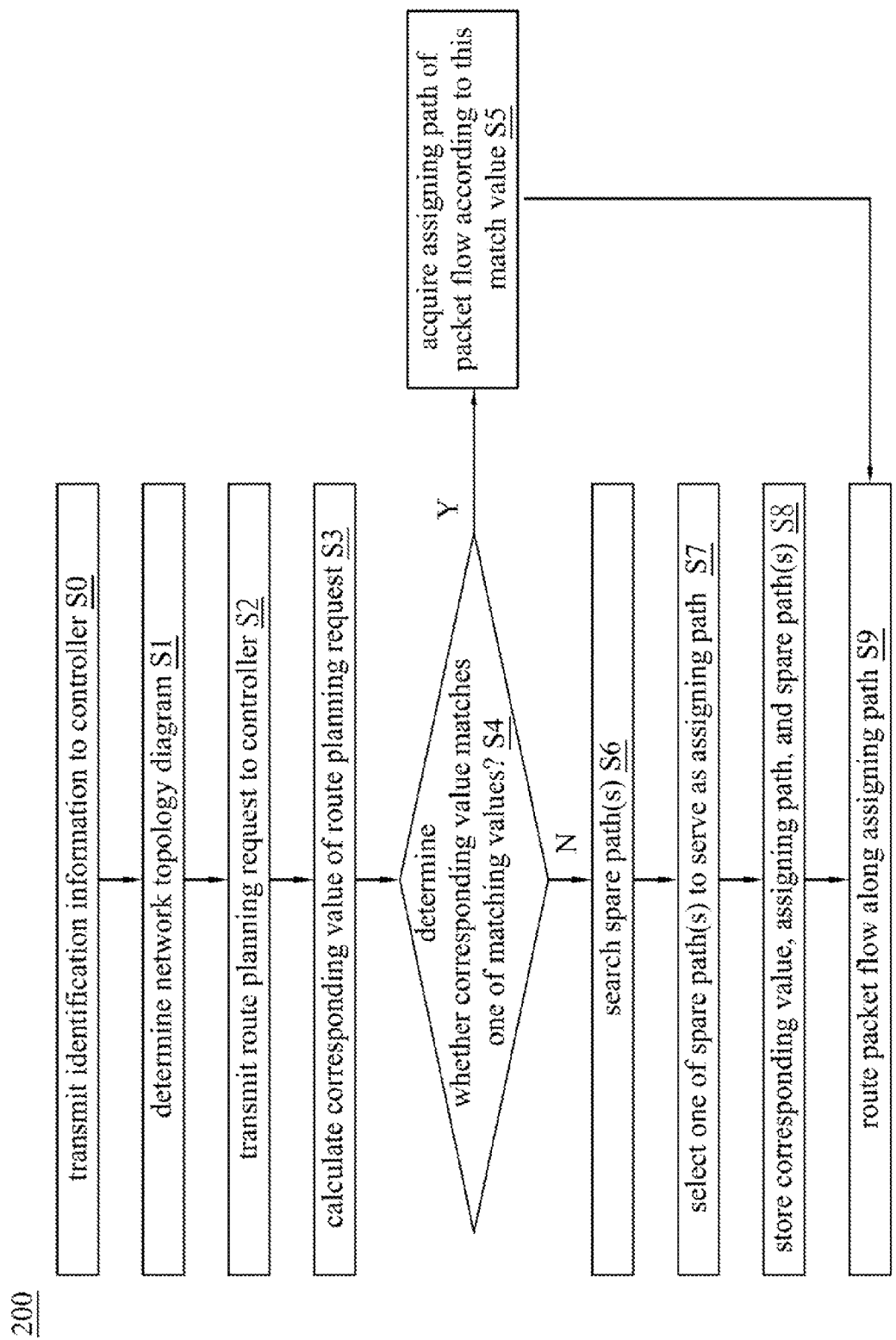
FIG. 2 is a flowchart of a routing method in accordance with one embodiment of the present disclosure.

FIG. 2 is a flowchart of a routing method 200 in accordance with one embodiment of the present disclosure. The routing method 200 includes steps S0-S9 outlined below.

In step S0, the nodes N1-N5 transmit identification information of themselves to the controller 100. For example, the controller 100 can send an instruction to the nodes N1-N5 to instruct the nodes N1-N5 to respectively transmit to the controller 100 identification information of the nodes N1-N5. Next, the controller 100 can receive the identification information of the nodes N1-N5 to construct a network topology diagram corresponding to the network system 10. The network topology diagram may reflect the connection relation among the nodes N1-N5. In practice, the controller 100 can instruct the nodes N1-N5 to broadcast an LLDP packet to the adjacent nodes N1-N5 to make the adjacent nodes N1-N5 exchange the identification information of themselves with each other. Subsequently, the controller 100 can send another instruction to the nodes N1-N5 to cause the nodes N1-N5 to pass the identification information of the adjacent nodes N1-N5 back to the controller 100.

In step S1, the controller 100 determines the network topology diagram corresponding to the network system 10 according to the identification information of the nodes N1-N5.

In step S2, one of the nodes N1-N5 transmits to the controller 100 a route planning request (e.g., OpenFlow packet-in signal) corresponding to a packet flow.

In step S3, the controller 100 receives the route planning request and calculates a corresponding value of the route planning request according the route planning request. For example, this route planning request may contain a source address and a destination address of the packet flow, and the corresponding value may be calculated according to the source address and the destination address of the corresponding packet flow in the route planning request (e.g., through a hash function). In this embodiment, different packet flows correspond to different and unique corresponding values respectively.

In step S4, the controller 100 compares the corresponding value with matching values stored in the storage space 110, so as to determine whether the corresponding value matches one of the matching values, and accordingly determines whether the storage space 110 has stored an assigning path and one or more spare path(s) of the packet flow already. If the corresponding value matches one of the matching values, which indicates that the storage space 110 has stored an assigning path and one or more spare path(s) of said packet flow already, step S5 is executed. If the corresponding value does not match the matching values, which indicates that the storage space 110 does not store any assigning path or any spare path of said packet flow, step S6 is executed.

In step S5, under the condition that the corresponding value matches one of the matching values, the controller 100 acquires the assigning path and one or more spare path(s) of said packet flow from the storage space 110 according to this matching value.

In step S6, under the condition that the corresponding value does not match the matching values, the controller 100 searches one or more spare path(s) of said packet flow according to the network topology diagram and the route planning request. When there is more than one searched spare path, these spare paths are different from each other. That is, these spare paths pass through different ones of the nodes N1-N5.

In step S7, the controller 100 selects one of the one or more spare path(s) of said packet flow to serve as the assigning path of the packet flow according to the route planning request.

In step S8, the controller 100 stores the corresponding value in the storage space 110 to serve as a new matching value. In addition, the controller 100 also stores the one or more spare path(s) and the assigning path of said packet flow in the storage space 110 corresponding to the new matching value.

In step S9, after step S5 or step S8 is executed, the controller 110 routes said packet flow along the assigning path.

With such operation, after packet forwarding rules corresponding to the assigning path in (at least a part of) the nodes N1-N5 become invalid, the controller 100 can provide new and identical packet forwarding rules to (the at least a part of) the nodes N1-N5 instantly, so as to route the packet flows with identical characteristics to the same transmission path without unnecessary path planning. Thus, the efficiency of the network system 10 can be improved.

In accordance with one embodiment, in step S6, the controller 100 can acquire spare paths corresponding to said packet flow by repeatedly executing a shortest path algorithm (e.g., Dijkstra algorithm).

After executing the shortest path algorithm one time to acquire one of the spare paths, the controller 100 selectively tags at least a part of the nodes N1-N5 through which the acquired spare path passes (e.g., tags the nodes through which the acquired spare path passes except for the source node and destination node of the acquired spare path) by using flags. Subsequently, the controller 100 executes the shortest path algorithm again to acquire another one of the spare paths. During this execution of the shortest path algorithm, the tagged nodes are excluded, such that a different one of the spare paths can be acquired. In such a manner, the spare paths of said packet flow can be acquired by the controller 100.

For example, the controller 110 can execute the shortest path algorithm one time in a first period to acquire one of the spare paths (e.g., path N1→N3→N2) and tag the node through which this acquired spare path passes (e.g., the node N1). Subsequently, the controller 110 can execute the shortest path algorithm again in a second period after the first period, in which the tagged node is excluded during executing the shortest path algorithm in the second period, so as to acquire another one of the spare paths (e.g., the path N1→N4→N2). Similarly, the controller 110 tags the node through which said another spare path passes (e.g., the node N4). At this time, since it is not possible for the controller 100 to search another one of the spare paths which does not pass through the tagged nodes (e.g., the nodes N3, N4), the controller 100 stops executing the shortest path algorithm.

Moreover, in one embodiment, the controller 100 can count the number of times the shortest path algorithm is executed, and stop executing the shortest path algorithm after the number reaches a predetermined threshold (e.g., 3). In such a manner, an unnecessary number of spare paths can be avoided, so as to prevent overly increasing the load of the controller 100.

In accordance with one embodiment of the present disclosure, the route planning request may include a source IP address IP_S, a destination IP address IP_D, a source port number P_S, a destination port number P_D, a protocol type P_TYPE, and so on. The controller 100 can calculate a function value H of a hash function according to the source IP address IP_S, the destination IP address IP_D, the source port number P_S, the destination port number P_D, the protocol type P_TYPE, and a quantity of the one or more spare path(s) of said packet flow (the quantity is referred to as Q). Next, the controller 100 can select one of the spare paths of said packet flow to serve as the assigning path of said packet flow according to the function value H of the hash function.

In accordance with one embodiment of the present disclosure, in step S7, the source IP address IP_S, the destination IP address IP_D, the source port number P_S the destination port number P_D, the protocol type P_TYPE, and the quantity Q satisfy the following equation:

$$H=(IP\_S+IP\_D+P\_S+P\_D+P\_TYPE)\%Q.$$

In accordance with one embodiment of the present disclosure, in step S9, the controller 100 can write packet forwarding rules corresponding to the assigning path into forwarding tables of the nodes through which the assigning path passes, so as to forward said packet flow along the assigning path.

It should be noted that details of steps S0-S9 described above can be ascertained by referring to the paragraphs above, and a description in this regard is not be repeated herein.

Although the present disclosure has been described in considerable detail with reference to certain embodiments thereof, other embodiments are possible. Therefore, the scope of the appended claims should not be limited to the description of the embodiments contained herein.

What is claimed is:

1. A routing method for a network system, wherein the network system comprises a plurality of nodes and a controller, and the controller comprises a storage space, the routing method comprising:

transmitting identification information of the plurality of nodes to the controller through the plurality of nodes, respectively;

receiving the identification information to construct a network topology diagram through the controller;

transmitting a route planning request corresponding to a packet flow to the controller through one of the plurality of nodes;

receiving the route planning request and calculating a corresponding value according to the route planning request through the controller;

comparing the corresponding value with a plurality of matching values stored in the storage space through the controller, so as to determine whether the corresponding value matches one of the plurality of matching values;

under a condition that the corresponding value matches a corresponding one of the plurality of matching values, acquiring an assigning path of the packet flow stored in the storage space according to the corresponding one of the plurality of matching values, and routing the packet flow along the assigning path through the controller;

under a condition that the corresponding value does not match the plurality of matching values, repeatedly executing a shortest path algorithm to acquire a plurality of spare paths of the packet flow through the controller according to the network topology diagram and the route planning request, wherein the plurality of spare paths of the packet flow are different from each other, wherein the step of repeatedly executing the shortest path algorithm to acquire the plurality of spare paths of the packet flow comprises:

executing the shortest path algorithm one time in a first period to acquire one of the plurality of spare paths, and selectively tagging a part of the plurality of nodes via which the acquired one of the plurality of spare paths passes through the controller;

executing the shortest path algorithm again in a second period after the first period to acquire another one of the plurality of spare paths through the controller, wherein the tagged nodes are not calculated in the second period;

counting a number of times the shortest path algorithm is executed through the controller; and stopping execution of the shortest path algorithm through the controller under a condition that the number of times the shortest path algorithm is executed reaches a redetermined threshold; and selecting one of the plurality of spare paths of the packet flow to serve as the assigning path of the packet flow according to the route planning request, and routing the packet flow along the assigning path through the controller.

2. The routing method as claimed in claim 1, wherein the step of selecting one of the plurality of spare paths of the packet flow to serve as the assigning path of the packet flow according to the route planning request comprises:

calculating a function value of a hash function through the controller according to a source internet protocol address (source IP address), a destination internet protocol address (destination IP address), a source port number, a destination port number, a protocol type, and a quantity of the plurality of spare paths of the packet flow; and selecting one of the plurality of spare paths of the packet flow to serve as the assigning path of the packet flow through the controller according to the function value of the hash function.

3. The routing method as claimed in claim 1 further comprising:

after selecting one of the plurality of spare paths of the packet flow to serve as the assigning path of the packet flow according to the route planning request, storing the corresponding value of the packet flow in the storage space to serve as a new matching value through the controller; and storing the plurality of spare paths and the assigning path of the packet flow in the storage space corresponding to the new matching value through the controller.

4. A network system comprising:

a plurality of nodes configured to output identification information, wherein one of the plurality of nodes is configured to output a route planning request corresponding to a packet flow; and a controller comprising a storage space, wherein the controller is configured for:

receiving the identification information to construct a network topology diagram;

receiving the route planning request and calculating a corresponding value according to the route planning request;

comparing the corresponding value with a plurality of matching values stored in the storage space, so as to determine whether the corresponding value matches one of the plurality of matching values;

under a condition that the corresponding value matches a corresponding one of the plurality of matching values, acquiring an assigning path of the packet flow stored in the storage space according to the corresponding one of the plurality of matching values, and routing the packet flow along the assigning path;

under a condition that the corresponding value does not match the plurality of matching values, repeatedly executing a shortest path algorithm to acquire a plurality of spare paths of the packet flow according to the network topology diagram and the route planning request, wherein the plurality of spare paths of the packet flow are different from each other, wherein the controller is further configured for:

executing the shortest path algorithm one time in a first period to acquire one of the plurality of spare paths, and selectively tagging a part of the plurality of nodes through which the acquired one of the plurality of spare paths passes;

executing the shortest path algorithm again in a second period after the first period to acquire another one of the plurality of spare paths, wherein the tagged nodes are not calculated in the second period;

counting a number of times the shortest path algorithm is executed; and stopping execution of the shortest path algorithm under a condition that the number of times the shortest path algorithm is executed reaches a predetermined threshold; and selecting one of the plurality of spare paths of the packet flow to serve as the assigning path of the packet flow according to the route planning request, and routing the packet flow along the assigning path.

5. The network system as claimed in claim 4, wherein the controller is further configured for:

calculating a function value of a hash function according to a source internet protocol address (source IP address), a destination internet protocol address (destination IP address), a source port number, a destination port number, a protocol type, and a quantity of the plurality of spare paths of the packet flow; and selecting one of the plurality of spare paths of the packet flow to serve as the assigning path of the packet flow according to the function value of the hash function.

6. The network system s claimed in claim 4, wherein the controller is further configured for:

after selecting one of the plurality of spare paths of the packet flow to serve as the assigning path of the packet flow according to the route planning request, storing the corresponding value of the packet flow in the storage space to serve as a new matching value; and storing the plurality of spare paths and the assigning path of the packet flow in the storage space corresponding to the new matching value.

\* \* \* \* \*